United States Patent [19]

Clausen

[11] 4,248,369
[45] Feb. 3, 1981

[54] LASER CUTTING OF CERAMIC TUBING

[75] Inventor: Edward M. Clausen, Eastlake, Ohio

[73] Assignee: General Electric Company, Schenectady, N.Y.

[21] Appl. No.: 62,918

[22] Filed: Aug. 2, 1979

[51] Int. Cl.³ .............................................. B26F 3/00
[52] U.S. Cl. ................. 225/2; 219/121 LN; 225/96; 225/96.5
[58] Field of Search ............................ 225/2, 96, 96.5; 219/121 LN, 121 LG, 121 L

[56] References Cited

U.S. PATENT DOCUMENTS

| | | | |
|---|---|---|---|
| 2,879,439 | 3/1959 | Townes | 315/5 |
| 3,026,210 | 3/1962 | Coble | 106/39 |
| 3,157,328 | 11/1964 | Hennings et al. | 225/93.5 X |
| 4,044,936 | 8/1977 | Obersby et al. | 225/2 |
| 4,169,976 | 10/1979 | Cirri | 219/121 LN |

*Primary Examiner*—Frank T. Yost
*Attorney, Agent, or Firm*—Ernest W. Legree; Lawrence R. Kempton; Philip L. Schlamp

[57] ABSTRACT

Polycrystalline alumina tubing is scribed by means of laser pulses which are reiteratively focused on the same spots at spaced time intervals. By drilling small holes, the laser need be on for a very short period of time only, and only the surface layers are vaporized, thereby minimizing heat shock. The holes are deepened by repeating the series of pulses and directing them sequentially into the same holes. For tubing, an encoder is used which senses the angular position of the tubing as it is rotated and causes the laser to deliver pulses at the same angles at every revolution. When the holes have been sufficiently deepened, the tubing is snapped and breaks clean in the plane of the holes.

5 Claims, 5 Drawing Figures

LASER CUTTING OF CERAMIC TUBING

The invention relates generally to cutting ceramic material by means of a laser, and more particularly to cutting the polycrystalline alumina ceramic tubing used for lamp envelopes.

BACKGROUND OF THE INVENTION

Light-transmitting alumina ceramics, both the clear synthetic sapphire (single crystal) and the translucent polycrystalline material made in accordance with U.S. Pat. No. 3,026,210—Coble, are suitable for use as the arc tube in alkali metal-containing arc lamps. The polycrystalline material is cheaper and is almost universally used in high intensity sodium vapor lamps for outdoor lighting as in streets and public places. The method of preparing this ceramic involves sintering a pressed compact of finely divided alumina powder containing a small but effective amount of finely divided magnesia not exceeding 0.5 weight percent, at elevated temperatures in the range of 1700° to 1950° C., either in vacuum or in hydrogen. The sintering is continued long enough to produce a relatively uniform large grain size alumina structure which contains little or essentially no secondary magnesia alumina phase at the grain boundaries.

The lowest cost method of preparing alumina ceramic tubing for use as lamp bodies involves extruding a stiff paste of alumina powder in tubular form in lengths of 1 meter or more, sintering it, and then cutting the polycrystalline tubing into appropriate lengths. By way of example, the basic ingredients consisting of 99.9% pure $Al_2O_3$ with not over 0.5 wt% MgO are thoroughly mixed in the proper proportions, blended with a liquid organic binder suspension containing a stearate lubricant, and then compacted in an extruder from which it is extruded as tubing under a pressure in the range of 20 to 35 tons. The "green" density of the tubing thus prepared attains from 30 to 35% of the theoretical density of a single crystal of alumina. The raw tubing is next presintered in air for several hours at a temperature from 950° to 1000° C. The presintered material is then finally sintered at approximately 1900° C. for about 4 hours in an electric furnace provided with a hydrogen atmosphere. The resulting product consists of translucent polycrystalline alumina tubing, a typical size being 7.2 mm i.d., 0.5 mm wall thickness, and about 1 meter in length.

In order to utilize the tubing for lamp bodies, it must be cut into appropriate lengths, for instance about 9 cm. long for a 400 watt high pressure sodium vapor lamp. Up to now, this has been done using wet diamond saws which are relatively expensive and have a limited life. Also the sawing generates appreciable detritus, as a result of which the tubes have to be washed and dried after cutting. A considerable amount of handling is required for these operations and chipping or cracking of the tubes is common.

SUMMARY OF THE INVENTION

The general object of the invention is to provide a faster and more convenient way of cutting ceramic. More specifically, a method of cutting light-transmitting polycrystalline alumina tubing is sought which is quick, easy and requires little labor.

In accordance with my invention, the ceramic is scribed by means of laser pulses which are reiteratively focused on the same spots on the ceramic at spaced time intervals in order to drill a series of small holes along the desired fracture line and then deepen the same holes. A laser cuts by thermal evaporation, and the alumina ceramic cannot be cut with the laser on continuously because severe thermal shock would occur and cause cracking. By drilling small holes, the laser need be on for a very short period of time only, for instance one millisecond, and only the surface layers are vaporized with little heat transfer to the bulk, thereby minimizing thermal shock. In order to obtain holes deep enough to assure fracture along the desired line notwithstanding the low power of the pulses, the series of pulses is repeated one or more times and directed sequentially into the same holes. Thus the holes are deepened at each pass until the desired depth is attained and thermal shock is avoided. The holes are deepened enough that the material can be readily broken along the line of weakness which they define.

In a preferred technique according to my invention for cutting polycrystalline alumina tubing, the tubing is gripped in a rotating chuck to which a shaft encoder is coupled. The encoder senses the angular position of the tube and completes a circuit which causes the laser to deliver pulses at the same angular locations at every revolution. By way of example, the encoder may divide a revolution into 100 equal angular intervals and control the laser to drill exactly 100 evenly spaced holes. The laser beam penetrates the same hole at each revolution and by multiplying the number of revolutions, the hole may be deepened as much as desired without producing thermal shock. The scribed tubing is then snapped and breaks clean in the plane of the holes.

DETAILED DESCRIPTION

Figure 1:
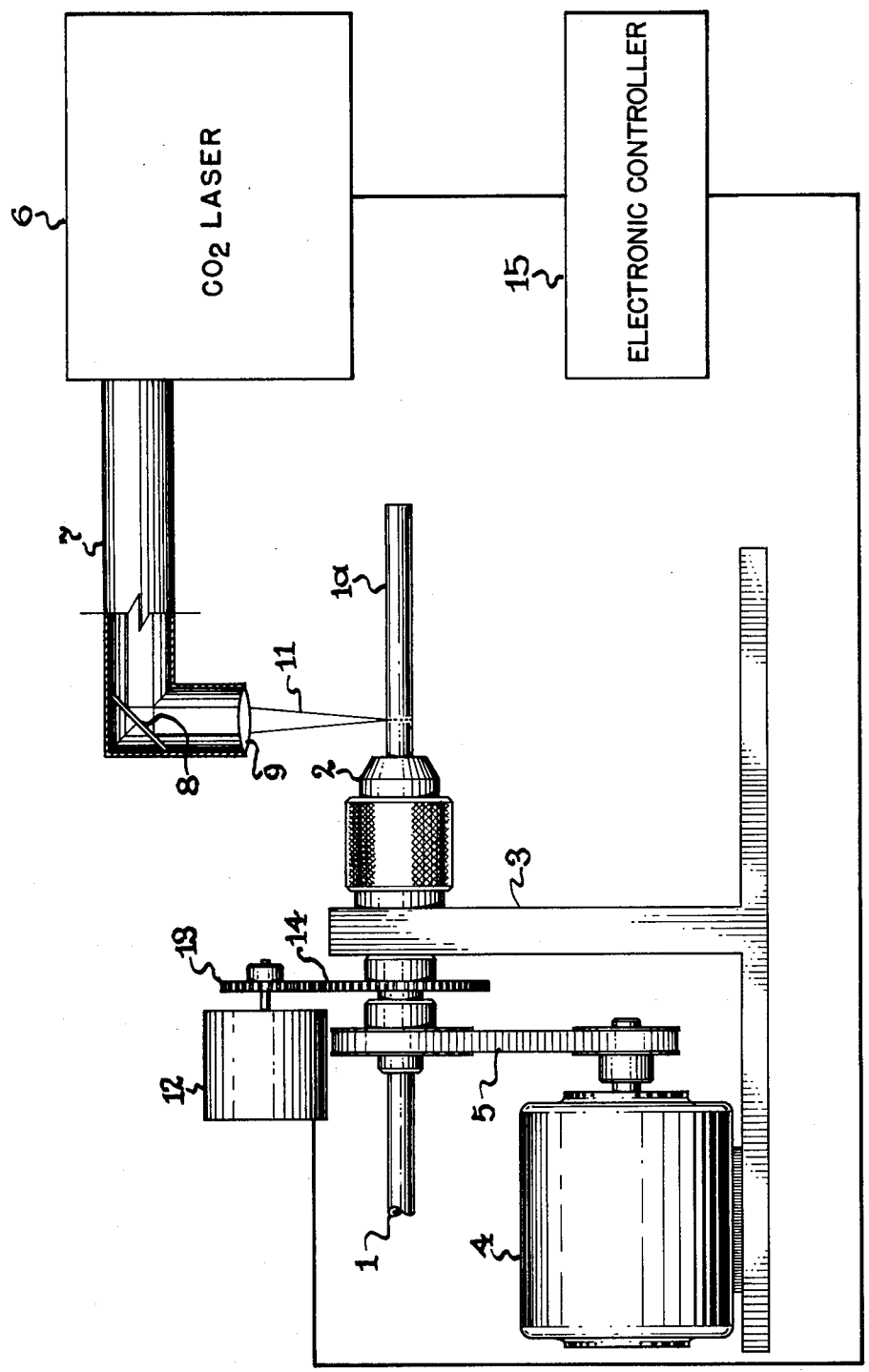
FIG. 1 shows in partly diagrammatic form apparatus for cutting polycrystalline alumina tubing by laser pulsing in accordance with the invention.

Referring to FIG. 1, a length of polycrystalline alumina tubing 1 is shown seized in a rotatable head comprising a chuck 2 journalled in a standard 3. The representation is partly diagrammatic and the headstock of a conventional glass lathe would be suitable for the purpose. The chuck is driven by electric motor 4 through a belt drive 5. The tubing is advanced from left to right through the head and adjusted before tightening the chuck so that the portion 1a projecting beyond the laser scribing plane is the desired length for making into a lamp body.

A carbon dioxide laser represented by the block 6 emits coherent radiation in the infrared at 10.6 microns through the optical tube 7. A mirror 8 in the optical tube and lens system 9 allow the beam 11 to be focused down on the alumina tubing 1 and the spot size to be made as small as desired. A suitable laser equipment is the Model 300 of Photon Sources of Livonia, Michigan. It has a rated continuous wave output of 450 watts and may be pulsed at rates up to 2500 Hz with a 100 microsecond minimum pulse width.

A shaft encoder 12 is mechanically coupled to the shaft of the chuck through intermeshing spur gears 13, 14. The encoder senses the angular position of the chuck, and through an electronic controller 15 causes a signal to be delivered to the laser so that the laser in turn delivers a pulse at the same angular location of the chuck for every revolution. A suitable encoder is made by Encoder Products of Sand Point, Idaho.

Figure 2:
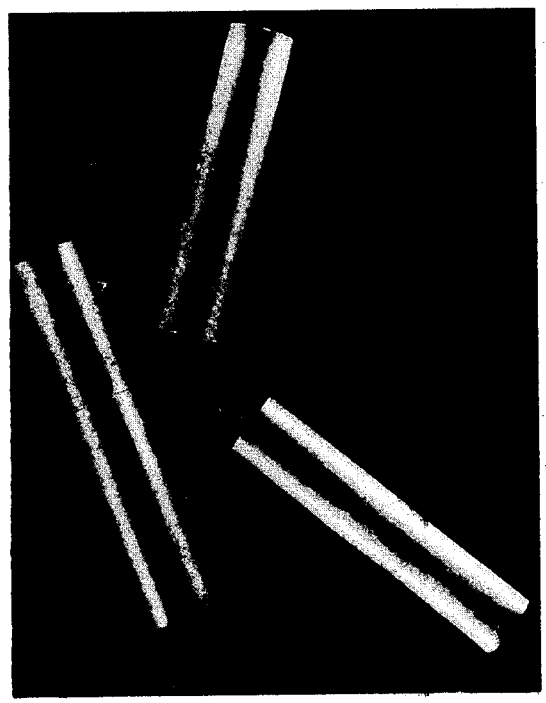
FIG. 2 is a photograph showing lengths of alumina ceramic tubing of which one is laser pulse-scribed.

The following examples illustrate the use of the invention in cutting translucent polycrystalline alumina tubing of 7.2 mm i.d. and 0.5 mm wall thickness as illustrated in FIG. 2. The parameters used for scribing the holes were as follows:

| | |
|---|---|
| Average source power (CW) | 250 watts |
| Lens focal length | 3.54 inches |
| Pulse length | 1 millisecond |
| Interval between pulses | 4 milliseconds |
| Total pulses per scribing | 400 |
| Revolutions per scribing | 4 |
| Tube rotational speed | 120 rpm |

Figure 3:
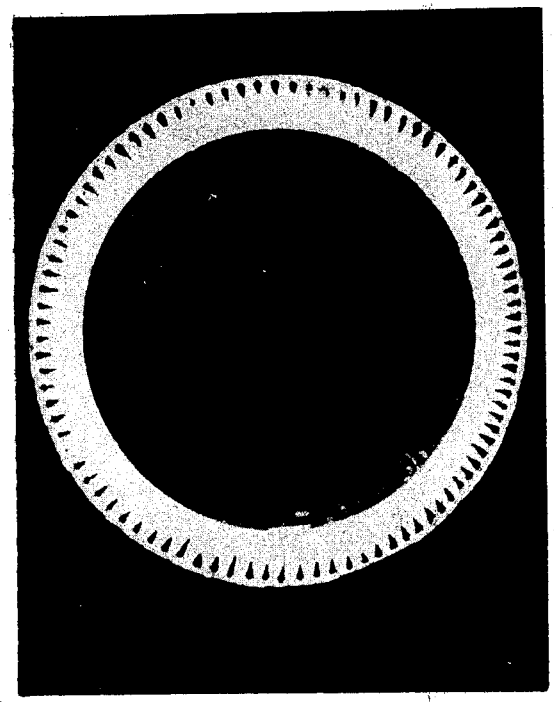
FIG. 3 is a photographic end view of tubing which has been laser pulse-scribed in accordance with the invention and then snapped.
Figure 4:
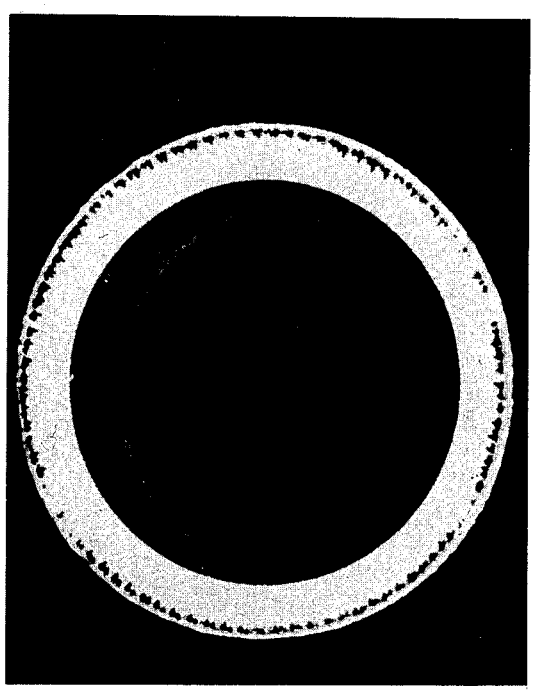
FIGS. 4 and 5 are photographic end views of tubing which has been laser pulse-scribed without coincidence of sequential pulses as required by the invention.
Figure 5:
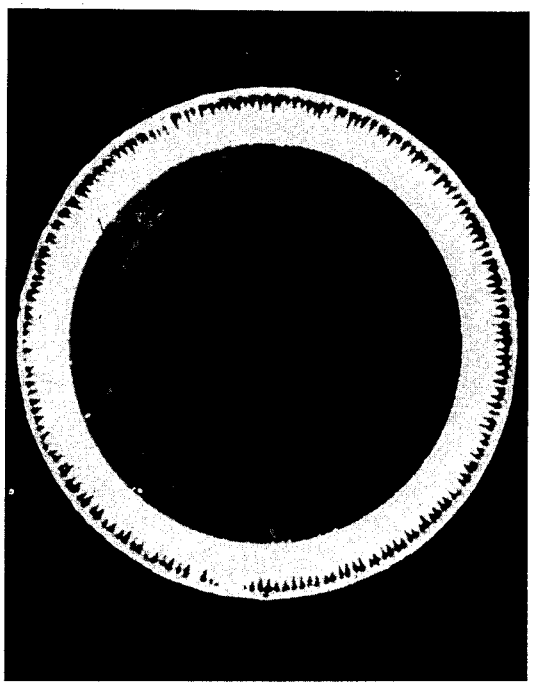

The scribed line corresponding to the plane of holes is readily seen in the piece of tubing next to the left hand edge of the photograph in FIG. 2. When the light pulses are reiteratively focused at the same spots in accordance with the invention, the appearance of the tube ends after snapping is as shown in FIG. 3. With the short pulse duration and the other parameters previously given, the tube rotates less than ¾ angular degree during the duration of a pulse, and 100 holes with a center-to-center distance of about 0.010" are drilled during the first revolution of the tube. If the rotational speed of the tube is constant, or if, as preferred, a shaft encoder is used to assure that the pulses enter precisely the same holes at each revolution, the same holes are deepened at each subsequent revolution. On the other hand if the rotational speed is not constant and no shaft encoder is used, the holes drilled during the second revolution and others subsequent to the first, will be located intermediately between the original holes. The result will be a series of shallow closely spaced holes that do not penetrate very deeply into the wall, as shown in FIGS. 4 and 5. Interspersed among the shallow holes there may be deeper ones as shown for instance in FIG. 5, caused by momentary spatial coincidence of a laser pulse with a preexisting hole.

I have compared the force required to snap laser-scribed tubes where iterative pulsing in the same holes according to the invention was used, with the force required where the location of the laser holes was allowed to wander. The force was usually higher in the latter case. A microscopic examination of the cut ends revealed that the holes in the tubes requiring the highest force were very small, spaced closely together, and did not penetrate very deeply into the wall. When such tubes were snapped in two, jagged or chipped edges frequently occurred and they are doubtless due to the higher forces and longer distance which the crack must propagate during snapping. The jagged edges may make the tubes unacceptable for lamp bodies. The tubes that could be snapped easily had fewer, larger and deeper holes and this result was substantially always achieved by laser scribing according to the invention. Such tubes when snapped in two had clean edges and presented no problems to sealing with ceramic plugs in lamp manufacture.

For example previously given, I found that the ceramic will frequently crack when the holes are drilled with pulses longer than 1 millisecond, or, depending on spot diameter, when the total energy content per pulse is greater than 0.35 joule. I have concluded that such cracking is due to thermal shock. My invention, by using low power pulses which are repeated in the identical spots at relatively long time intervals, overcomes the problem of cracking by heat shock and provides a practical low cost method of cutting ceramic tubing.

What I claim as new and desire to secure by Letters Patent of the United States is:

1. The method of cutting ceramic material which comprises:
   drilling a series of fine shallow holes in the material by focusing a pulsed laser beam thereagainst at a series of spaced spots,
   deepening said holes by repeatedly directing the beam into the identical spots at spaced time intervals, and
   breaking said material along the line of weakness determined by said holes.

2. The method of claim 1 wherein the ceramic material is continuously displaced relative to the laser beam, and the laser beam is pulsed for short enough time intervals that relative movement between the material and the laser beam during said intervals will not appreciably reduce the definition of the holes.

3. The method of claim 1 wherein said ceramic material is polycrystalline alumina.

4. The method of cutting polycrystalline alumina ceramic tubing which comprises:
   seizing the tubing in a rotary fixture and causing it to rotate,
   focusing a laser beam which can be pulsed on the tubing,
   pulsing the laser in coincidence with selected angular positions of the fixture whereby a series of fine holes are drilled in the tubing which are deepened at every revolution, and
   breaking the tubing along the plane of weakness determined by said holes.

5. The method of claim 4 wherein a shaft encoder is coupled to said rotary fixture and provides a signal to an electronic controller for pulsing said laser in coincidence with said angular positions.

* * * * *